C. A. FREDERICKS.

Speaking-Tube.

No. 6,604.

Reissued Aug. 24, 1875.

Witnesses:

Arthur C. Fraser.

George W. Chatcher

Inventor:

C. A. Fredericks.

Per Burke & Fraser

Attorneys.

N. PETERS, PHOTO-LITHOGRAPHER, WASHINGTON, D. C.

UNITED STATES PATENT OFFICE.

CHRISTIAN A. FREDERICKS, OF BROOKLYN, NEW YORK.

IMPROVEMENT IN SPEAKING-TUBES.

Specification forming part of Letters Patent No. 135,421, dated February 4, 1873; reissue No. 5,588, dated October 7, 1873; reissue No. 6,604, dated August 24, 1875; application filed February 13, 1875.

*To all whom it may concern:*

Be it known that I, CHRISTIAN A. FREDERICKS, of Brooklyn, in the county of Kings and State of New York, (formerly of the city of New York in said State,) have invented a new and useful Improvement in Speaking-Tubes, of which the following is a specification:

My invention has for its object to improve the construction of the part of speaking-tubes adjacent to the mouth-piece, so as to make it more reliable in use and less liable to get out of order, while the expense of constructing such is greatly reduced.

My invention consists in the combination, with a speaking-tube having a valve-seat, as hereinafter described, of a valve suspended from its upper edge by a horizontal rod passing through the speaking-tube, and provided with a handle for operating said rod and valve, all in such manner that the valve will close by its own weight or gravitation, and thereby rendering the usual provision of springs to accomplish this object unnecessary. The invention also consists of certain other improvements, all of which will be hereinafter set forth and described.

Figure 1:
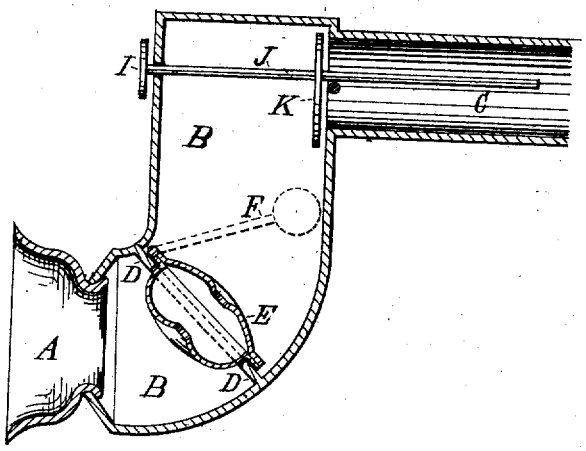
Figure 2:
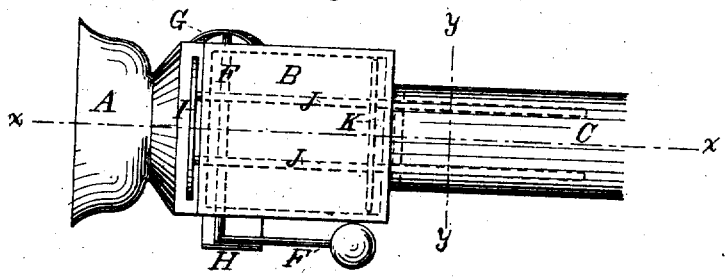
Figure 3:
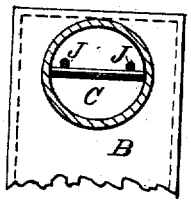

In the drawings, Figure 1 is a detail sectional view of a part of a speaking-tube illustrating my invention, taken through the line *x x*, Fig. 2. Fig. 2 is a plan or top view of the same. Fig. 3 is a detail section of the same.

Like letters of reference designate corresponding parts in all of the figures.

Let A represent the mouth-piece of a speaking-tube, and B a chamber to which the mouth-piece is attached. In this chamber the valve E is placed, with which the whistle is connected. C represents the body of the tube. D is the valve-seat, formed by attaching to the walls of the chamber B the edges of a plate having a hole through its center of sufficient size for the free passage of air. The seat D should be so inclined that the valve E may be held down upon it by its own weight; but such inclined position is necessary only in so far as to cause the valve to fall and rest against the seat when released. The valve E, at its upper edge, is attached to a wire, F, which passes through and is journaled in holes formed in the walls of the chamber B. One end of the wire is bent into the form of a crank, to enable the valve E to be conveniently raised by it.

To prevent any lateral movement of the valve in the tube, and avoid undue friction resulting from the bearing of the edges of the valve against the interior sides of the tube, I have shown guards G and H secured to the opposite sides of the valve-chamber B, and arranged to intercept and prevent any motion endwise of the wire F. These guards may be attached as collars or sleeves to the wire F, instead of the chamber B, if desired, or be entirely dispensed with if the body of the tube is constructed, in relation to the valve, in such a manner as to cause the sides of the same to act as guides to the valve; but as all friction must, as far as possible, be avoided, I prefer to use both appliances.

The whistle for signaling may be formed in the valve E, and may, in fact, form said valve, as shown; and the said valve and its seat should occupy such a position in the chamber in relation to the position of the tube when put in place that the valve will fall to its seat and remain seated by its own weight.

It is quite important, in the within-described arrangement of the valve-seat, that the interior sides of that portion of the tube or chamber in which the valve works should be made flat or straight, at least enough so to suffice for guiding the valve in its working.

I is the indicator-plate, which is attached to the ends of two wires, J J, which pass through holes in the upper part of the valve-chamber B, and to which, within said chamber, is attached a plate, K, in such a position as to cover the mouth of the pipe C when the indicator is pushed back, as shown in Fig. 1.

By this construction, when the other end of the tube is blown into, the first effect is to push out the indicator, and then to sound the whistle.

The ends of the wires J J pass into the pipe C, as shown in Figs. 2 and 3, and rest upon and are supported by a wire placed across the inner end of pipe C, as shown in Fig. 3.

I claim as my invention—

1. The combination of the self-acting valve E, closing by its own weight, the valve-seat D′, and guards to prevent lateral movement of the valve, substantially as and for the object specified.

2. The indicator composed of the plate I, rods J J, and plate K, in combination with a speaking-tube, substantially as shown and described.

CHRISTIAN A. FREDERICKS.

Witnesses:
ARTHUR C. FRASER,
HENRY CONNETT.